(12) United States Patent
Miura et al.

(10) Patent No.: US 7,940,263 B2
(45) Date of Patent: May 10, 2011

(54) CURVED-SURFACE GENERATING METHOD AND PROGRAM, AND THREE-DIMENSIONAL SHAPE PROCESSING APPARATUS

(75) Inventors: Masami Miura, Nagasaki (JP); Kensuke Ide, Ritto (JP); Takayuki Kawano, Nagasaki (JP); Masayuki Matsukuma, Nagasaki (JP); Shinobu Kishikawa, Nagasaki (JP); Masuko Kushiyama, Nagasaki (JP); Takeshi Nakahama, Nagasaki (JP); Mitsuhiko Izumi, Nagasaki (JP)

(73) Assignees: Mitsubishi Heavy Industries, Ltd., Tokyo (JP); Pal Corporation, Ltd., Nagasaki (JP)

( * ) Notice: Subject to any disclaimer, the term of this patent is extended or adjusted under 35 U.S.C. 154(b) by 762 days.

(21) Appl. No.: 11/886,703

(22) PCT Filed: Mar. 20, 2006

(86) PCT No.: PCT/JP2006/305561
§ 371 (c)(1),
(2), (4) Date: Feb. 1, 2008

(87) PCT Pub. No.: WO2006/101080
PCT Pub. Date: Sep. 28, 2006

(65) Prior Publication Data
US 2009/0051680 A1    Feb. 26, 2009

(30) Foreign Application Priority Data
Mar. 22, 2005   (JP) .................................. 2005-082656

(51) Int. Cl.
*G06T 17/00* (2006.01)

(52) U.S. Cl. ......... 345/420; 345/419; 345/442; 345/585
(58) Field of Classification Search .................. None
See application file for complete search history.

(56) References Cited

U.S. PATENT DOCUMENTS

| 5,991,703 A | 11/1999 | Kase |
| 6,711,530 B1* | 3/2004 | Kase ................................. 703/2 |
| 6,907,140 B2* | 6/2005 | Matsugu et al. ............. 382/195 |
| 7,260,250 B2* | 8/2007 | Summers et al. ............ 382/128 |

(Continued)

FOREIGN PATENT DOCUMENTS

JP    11-39517 A    2/1999

(Continued)

OTHER PUBLICATIONS

Yoshimi et al., "Curved Surface Representation Using Max-Min Curvature Countour Network," *Trans. Institute of Electronics, Information and Communication Engineers (IEICE)*, vol. J77-D-II, No. 1, 1994, pp. 61-68.

(Continued)

*Primary Examiner* — Said Broome
(74) *Attorney, Agent, or Firm* — Birch, Stewart, Kolasch & Birch, LLP

(57) ABSTRACT

A plurality of representative points are selected from a group of points obtained as results of shape measurement of an object, respective principal curvatures are calculated at the representative points on the basis of positional relationships between the representative point and a plurality of points existing around the representative point, a line of curvature is created on the basis of the principal curvatures of the representative points and a curved surface is generated using this line of curvature.

6 Claims, 7 Drawing Sheets

U.S. PATENT DOCUMENTS

| | | | |
|---|---|---|---|
| 7,274,810 B2 * | 9/2007 | Reeves et al. | 382/128 |
| 2003/0106378 A1 | 6/2003 | Giannakopoulos et al. | |
| 2004/0167775 A1 | 8/2004 | Sorin | |

FOREIGN PATENT DOCUMENTS

| | | |
|---|---|---|
| JP | 11-65628 A | 3/1999 |
| JP | 11-195139 A | 7/1999 |
| JP | 2003-346182 A | 12/2003 |
| JP | 2004-127099 A | 4/2004 |
| JP | 2004-532984 A | 10/2004 |
| JP | 2005-149245 A | 6/2005 |

OTHER PUBLICATIONS

Takeguchi et al., "Robust Object Recognition Based on Depth Aspect Image Matching," *Trans. Institute of Electronics, Information and Communication Engineers (IEICE)*, vol. J84-D-II, No. 8, 2001, pp. 1710-1721.

Huang et al., "Combinatorial manifold mesh reconstruction and optimization from unorganized points with arbitrary topology", Computer Aided Design, Elsevier Publishers BV, vol. 34, No. 2, Feb. 1, 2002, pp. 149-165, XP004322747.

Abeysekera et al., "Investigation of different frequency estimation techniques using the phase vocoder", ISCAS 2001. The 2001 IEEE International Symposium on Circuits and Systems, vol. 2, May 6, 2001, pp. 265-268, XP010540629.

Hameiri et al., "Estimating principal curvatures and the Darboux frame from real 3D range data", 3D Data Processing Visualization and Transmission, 2002. Proceedings. First International Symposium on Jun. 19-21, 2002, Piscataway, NJ, USA, IEEE, Jun. 19, 2002, pp. 258-267, XP010596666.

Girshick at al., Line Direction Matters: An Argument for the Use of Principal Directions in 3D Line Drawings, Proceedings of the First International Symposium on Non-Photorealistic Animation and Rendering, 2000, pp. 43-52 XP002554843.

* cited by examiner

CURVED-SURFACE GENERATING METHOD AND PROGRAM, AND THREE-DIMENSIONAL SHAPE PROCESSING APPARATUS

TECHNICAL FIELD

The present invention relates to a curved-surface generating method for generating a curved surface from a group of points formed of a plurality of measurement points obtained as the results of shape measurement of an object.

BACKGROUND ART

Conventionally, when reproducing, in parameter space, a three-dimensional shape model for use in CAD (Computer Aided Design) or CAM (Computer Aided Manufacturing) from the results of shape measurement of an object, a known technique is to create polygonal surfaces, such as triangles etc., by connecting each of a group of points with straight lines.

For example, Japanese Unexamined Patent Application, Publication No. 2003-346182 discloses a three-dimensional polygon data creating method which can obtain polygon data for an object surface with superior performance and stability from three-dimensional group-of-points data which are the results of shape measurement of an object, using a matching triangles method.

Patent Document 1:
Japanese Unexamined Patent Application, Publication No. 2003-346182 (pages 2 to 8, and FIGS. 1 and 4).

DISCLOSURE OF INVENTION

However, in the invention of Patent Document 1 described above, because the shape is defined with polygonal approximations, there are some approximation errors for undevelopable curved surfaces among curved surfaces. Conventionally, to reduce these approximation errors, a technique for creating polygons as finely as possible to achieve precise approximation is used. However, with this technique, the amount of data becomes enormous, resulting in the problem that, in practice, the amount of required computer memory increases.

Furthermore, with the conventional technique, because surface normals are determined from polygons, it is not possible to obtain accurate normals according to the curvature of the curved surface. Therefore, there is a problem in that an error is included in the reproduced curved surface, and it is not possible to generate a curved surface with good precision.

The present invention has been conceived to solve the problems described above, and an object thereof is to provide a curved-surface generating method and program and a three-dimensional shape processing apparatus which can reduce the amount of data and generate a curved surface with high precision.

In order to solve the problems described above, the present invention employs the following solutions.

A first aspect of the present invention is a curved-surface generating method for generating a curved surface from a group of points formed of a plurality of measurement points obtained as results of shape measurement of an object, the curved-surface generating method including a representative-point selection step of selecting a plurality of representative points from the group of points; a principal-curvature calculating step of calculating respective principal curvatures at each of the representative points on the basis of positional relationships between each representative point and a plurality of the measurement points existing around this representative point; a line-of-curvature creating step of creating a line of curvature on the basis of the principal curvatures at each representative point; and a curved-surface generating step of generating a curved surface by using the line of curvature.

With this curved-surface generating method, after selecting the plurality of representative points from the group of points, the principal curvature at each representative point is calculated on the basis of the positional relationships between each representative point and the points existing around it, and the line of curvature is created from these principal curvatures. Then, by using this line of curvature, the curved surface is reproduced with a curve-surface reproduction technique or the like. In this way, the plurality of points around each representative point are taken as auxiliary points for obtaining the principal curvatures. Therefore, the reproduced curved surface can be represented using only the representative points. Accordingly, although the curved surface can be reproduced with an extremely small group of points, because the curved surface is reproduced using information about all points, it is possible to reproduce the curved surface with high precision.

In the curved-surface generating method described above, the principal-curvature calculating step may include a step of setting a normal at each representative point; a step of generating element vectors by joining each representative point and each points existing around this representative point; and a step of determining the principal curvatures on the basis of relationships between the normal and the element vectors.

With this method, a normal is set at each representative point and the same number of element vectors as the number of points existing around the representative point are generated by joining each representative point and the points existing around this representative point. Therefore, it is possible to obtain the principal curvatures with a simple technique on the basis of the relationships between the normal of the representative point and each element vector generated around the representative point.

In the curved-surface generating method described above, the principal-curvature calculating step may include a step of setting a normal at each representative point; a tangential-vector setting step of setting a tangential vector that is orthogonal to the normal; a step of generating element vectors by joining each representative point and each point existing around this representative point; a step of calculating angles formed by the tangential vector and the element vectors around the normal; a step of calculating angles formed by a tangential plane including the tangential vector and planes including the element vectors and defining the angles as curvatures; a step of creating angle-curvature tables by plotting the calculation results on a horizontal axis in angle-curvature tables; and a step of obtaining the principal curvatures on the basis of the curvature tables.

In this way, normal is set at the representative point and tangential vector which is orthogonal to the normal is set. In addition, by joining the representative point and each point existing around the representative point, the same number of element vectors as the number of points existing around the representative point is generated. Then, the angles that the tangential vector and the element vectors form around the normal are calculated, the angles formed by the tangential plane including the tangential vector and the planes including the element vectors are calculated for each element vector, and these calculation results are plotted in angle-curvature tables in which angle is shown on the horizontal axis and curvature is shown on the vertical axis to create angle-curvature tables. Thus, by obtaining the maximum curvature and the minimum curvature in these angle-curvature tables, it is possible to easily obtain the principal curvatures.

In the curved-surface generating method described above, the principal-curvature calculating step may include a step of setting a normal at each representative point; a tangential-vector setting step of setting a tangential vector that is orthogonal to the normal; a step of generating element vectors by joining each representative point and each point existing around this representative point; a step of calculating angles formed by the tangential vector and the element vectors around the normal; a step of calculating angles formed by a tangential plane including the tangential vector and planes including the element vectors and defining the angles as curvatures; a step of creating angle-curvature tables by plotting the calculation results on a horizontal axis in angle-curvature tables; an extraction step of extracting only a fundamental frequency from the curvature tables; and a principal-curvature obtaining step of obtaining the principal curvatures from the angle-curvature table on the basis of the fundamental frequency.

In this way, a normal is set at each representative point and a tangential vector which is orthogonal to the normal is set. In addition, by joining each representative point and each point existing around this representative point, the same number of element vectors as the number of points existing around the representative point is generated. Then, at each representative point, the angles formed by the tangential vector and the element vectors around the normal are calculated, the angles formed by the tangential plane including the tangential vector and the planes including the element vectors are calculated for each element vector, and these calculation results are plotted in angle-curvature tables in which angle is shown on the horizontal axis and curvature is shown on the vertical axis to create angle-curvature table. Then, only the fundamental frequency is extracted from these angle-curvature tables. Extraction of this fundamental frequency obtains the fundamental frequency by, for example, regarding the angle-curvature table as a time-series table and performing, for example, a fast Fourier transform on this table. Thereafter, by performing, for example, an inverse fast Fourier transform on this fundamental frequency, it is possible to obtain an angle-curvature table in which only the fundamental frequency is reflected. Because this angle-curvature table is a high-precision table from which noise is eliminated and accurate values are reflected, it is possible to obtain the principal curvatures with extremely high precision.

In the curved-surface generating method described above, the principal-curvature calculating step may include a step of generating element vectors by joining each representative point and each point existing around this representative point; a step of determining a group of normal vectors at each representative point by calculating vector products of the element vectors; and a step of determining an average vector of the group of normal vectors and defining the average vector as a normal vector at each of the representative points.

With this method, by obtaining the vector products of the plurality of element vectors generated by joining each representative point and each of the points existing around this representative point, the group of normal vectors at each representative point is obtained, and the average vector of this group of normal vectors is defined as the normal vector of that representative point. Therefore, it is possible to set a normal vector with higher reliability by using information about a plurality of points. Accordingly, it is possible to improve the precision of the curved surface reproduction.

A second aspect of the present invention is curved-surface generating program for executing, on a computer system, curved-surface generating processing for generating a curved surface from a group of points formed of a plurality of measurement points obtained as results of shape measurement of an object, the curved-surface generating program including a representative-point selection step of selecting a plurality of representative points from the group of points; a principal-curvature calculation step of calculating respective principal curvatures at each representative point on the basis of positional relationships between each representative point a plurality of the measurement points existing around this representative point; a line-of-curvature creating step of creating a line of curvature on the basis of the principal curvature at each representative point; and a curved-surface generating step of generating a curved surface by using the line of curvature.

A third aspect of the present invention is a three-dimensional shape processing apparatus which is provided with a curved-surface generating program and which generates a curved surface from a group of points formed of a plurality of measurement points obtained as results of shape measurement of an object by executing the curved-surface generating program, wherein the curved-surface generating program includes a representative-point selection step of selecting a plurality of representative points from the group of points; a principal-curvature calculating step of calculating respective principal curvatures at each representative point on the basis of positional relationships between each representative point and a plurality of the measurement points existing around this representative point; a line-of-curvature creating step of creating a line of curvature on the basis of the principal curvature at each representative point; and a curved-surface generating step of generating a curved surface by using the line of curvature.

The present invention affords an advantage in that it is possible to generate a curved surface with high precision, while reducing the amount of data.

BEST MODE FOR CARRYING OUT THE INVENTION

An embodiment of a three-dimensional processing apparatus for realizing a curved-surface generating method according to the present invention will be described below with reference to the drawings.

First Embodiment

Figure 1:
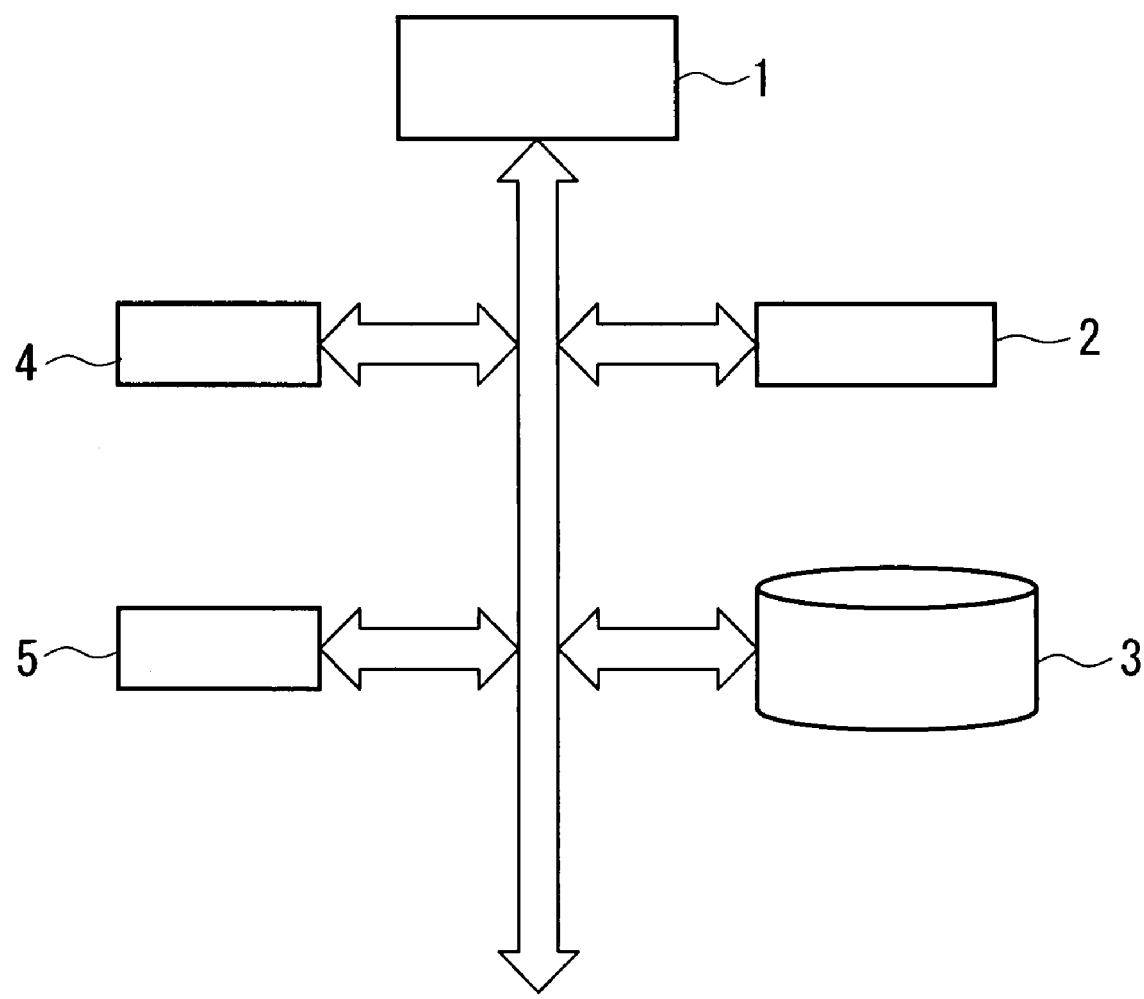
FIG. 1 is a block diagram showing, in outline, the configuration of a three-dimensional shape processing apparatus according to a first embodiment of the present invention.

FIG. 1 is a block diagram showing, in outline, the configuration of a three-dimensional shape processing apparatus according to a first embodiment of the present invention. As shown in FIG. 1, the three-dimensional shape processing apparatus according to this embodiment, which is a computer system such as a CAD (Computer Aided Design) or CAM (Computer Aided Manufacturing) system, is formed of a CPU (central processing unit) 1, a main storage device 2 such as a RAM (Random Access Memory), a secondary storage device 3 such as an HDD (Hard Disk Drive), an input device 4 such as a keyboard or mouse, an output device such as a monitor or printer, and so forth.

Various programs are stored in the secondary storage device 3, and the CPU 1 realizes various types of processing by reading programs from the secondary storage device 3 into the main storage device 2 such as the RAM and executing them.

Next, curved-surface generating processing (curved-surface generating method) for generating a curved surface from a group of points, in the three-dimensional shape processing apparatus having the above-described configuration, will be described with reference to the drawings. The processing shown below is realized by, for example, the CPU 1 reading a curved-surface generating program stored in the secondary storage device 3 into the main storage device 2 such as the RAM and executing it.

First, the CPU 1 acquires group-of-points data from a plurality of measurement points obtained as a result of shape measurement of an object. This group-of-points data may be stored in advance in a memory, such as the secondary storage device 3, installed in the three-dimensional shape processing apparatus, or it may be obtained online from another external device. In the present invention, the way in which this group-of-points data is acquired is not particularly limited.

When the group-of-points as described above (hereinafter referred to as "group of points") is acquired, a plurality of representative points are selected from the group of points (step SA1 in FIG. 2: representative points selection step). For example, in a group of points such as that shown in FIG. 3, a plurality of points are selected as representative points P0. Then, based on the positional relationship between each representative point P0 selected in step SA1 and a plurality of points existing around this representative point P0, the respective principal curvatures at each of the representative points P0 are calculated (step AS2: principal-curvature calculation step).

Details of the principal-curvature calculation step are described below by giving as an example a group of points belonging to an arbitrarily selected area Q from among the group of points shown in FIG. 3.

Figure 4:
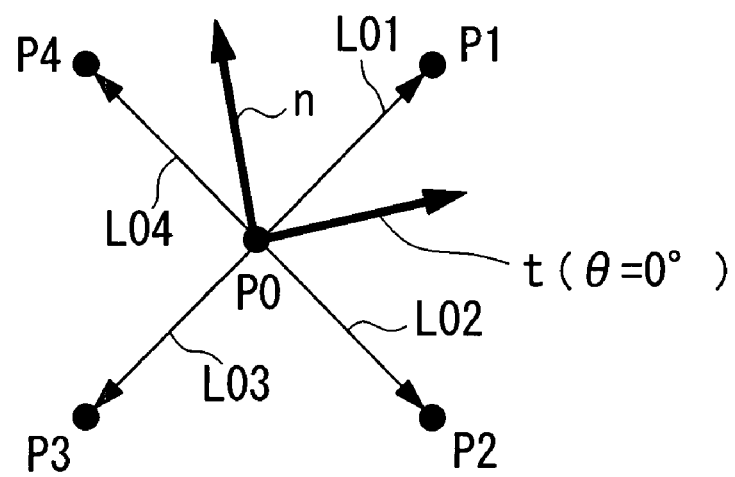
FIG. 4 is a diagram for explaining a principal-curvature calculation step.
Figure 5:
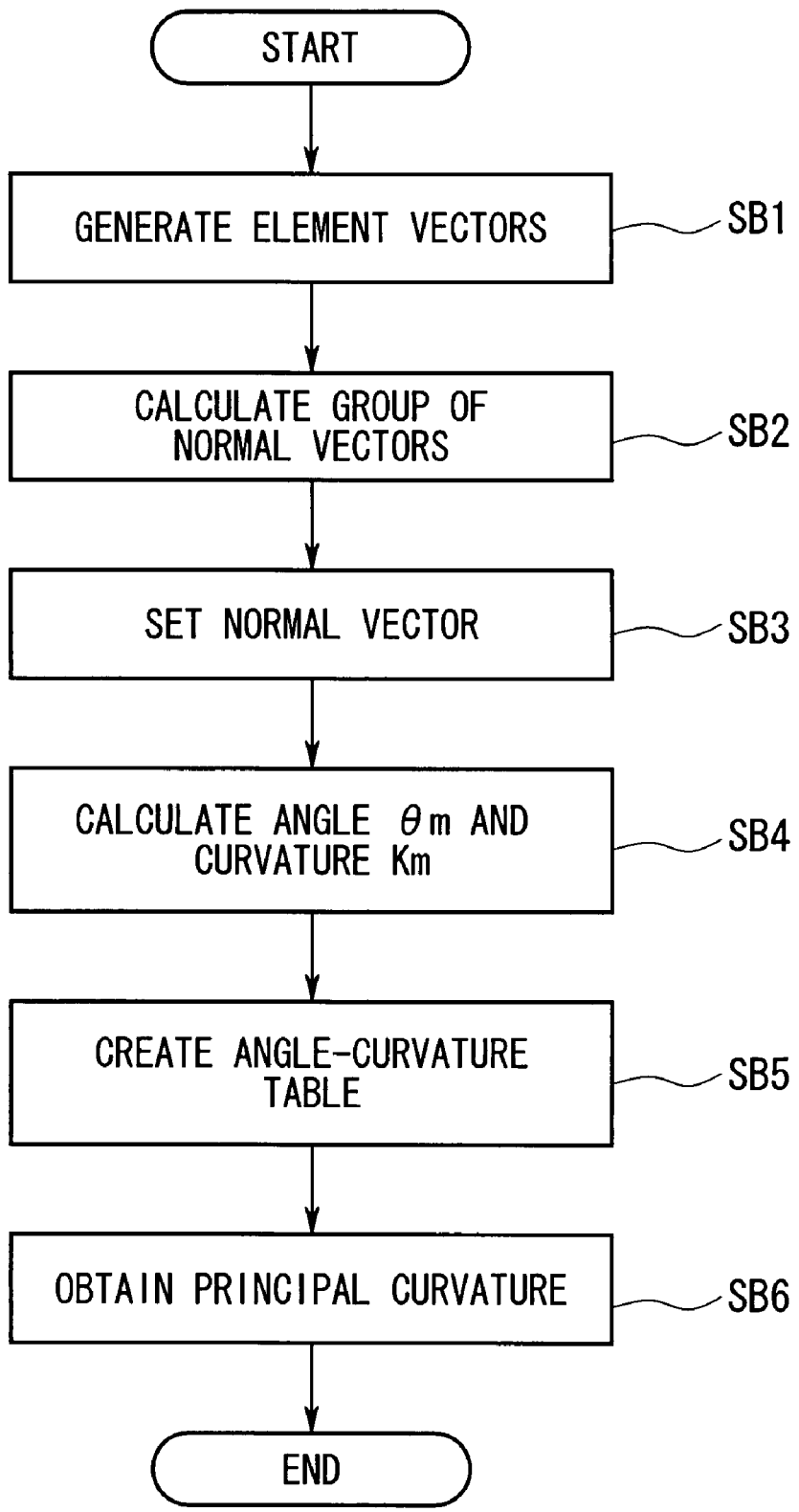
FIG. 5 is a flowchart showing the procedure of the principal-curvature calculation step according to the first embodiment of the present invention.

First, as shown in FIG. 4, element vectors L01, L02, L03, and L04 are generated by joining the representative point P0 to the points P1, P2, P3, and P4, respectively, which exist around P0 (step SB1 in FIG. 5).

Then, calculating the vector products of all combinations of the element vectors L01, L02, L03, and L04 yields a group of normal vectors (not shown in the drawing) at the representative point P0 (step SB2 in FIG. 5). Then, an average vector of the group of normal vectors is determined, and this average vector is defined as a normal vector n at the representative points P0 (step SB3 in FIG. 5).

Next, principal curvatures are determined on the basis of the respective relationships between this normal vector n and the element vectors L01, L02, L03, and L04. Specifically, a tangential vector t that is orthogonal to the normal n is set, the angles which this tangential vector t and each of the element vectors L01, L02, L03, and L04 form around the normal n are calculated, and the angles formed by a tangential plane including the tangential vector and planes including each of the element vectors L01, L02, and L04 are calculated as the curvatures (step SB4 in FIG. 5).

Figure 6:
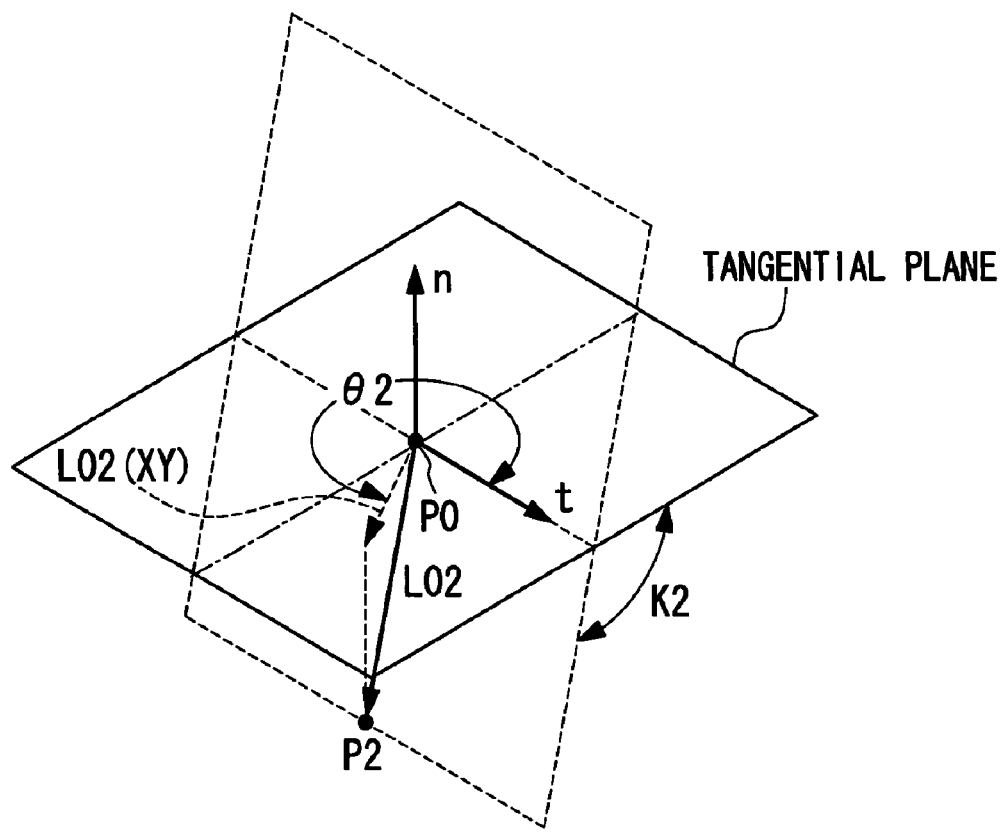
FIG. 6 is a diagram for explaining the principal-curvature calculation step.

For example, when the element vector L02 shown in FIG. 4 has the relationship shown in FIG. 6 with respect to the representative point P0, an angle $\theta 2$ formed by the tangential vector t and the vector component L02 (XY) in the tangential plane of the element vector L02 is calculated, and the angle formed by the plane including the element vector L02 and the tangential plane including the tangential vector t is obtained as a curvature K2.

In a similar fashion, angles $\theta$ and curvatures K are also calculated for point P1, P3, and P4 shown in FIG. 4.

Once such calculations for the points existing around the representative point P0 have been completed, angle-curvature tables are created by plotting the calculation results in angle-curvature tables showing angle $\theta$ on the horizontal axis and curvature K on the vertical axis and fitting these points using Euler's law (step SB5 in FIG. 5). As a result, an angle-curvature table such as that shown in FIG. 7, for example, is obtained. Points may be plotted in the angle-curvature table in parallel with the calculation.

Then, a maximum curvature Kmax and a minimum curvature Kmin in this angle-curvature table are obtained as the principal curvature (step SB6 in FIG. 5).

Figure 3:
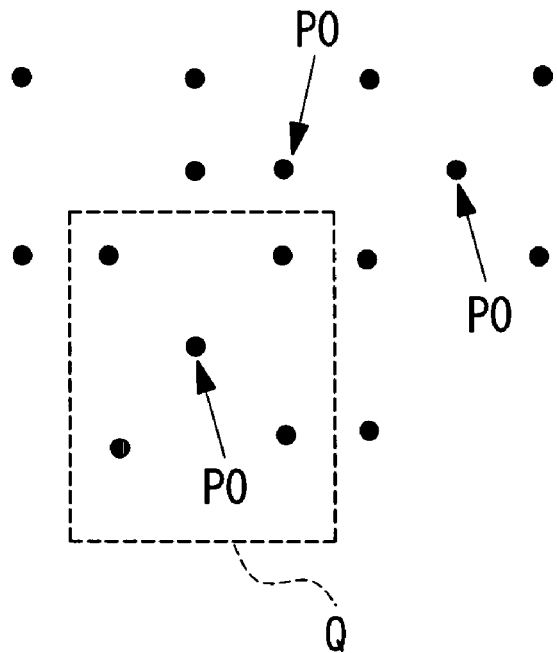
FIG. 3 is a diagram for explaining representative points.

Then, by performing the respective principal-curvature calculation processes described above for each of the representative points P0 set in the group of points shown in FIG. 3, the maximum curvature Kmax and the minimum curvature Kmin at each of the representative points P0 are obtained.

Figure 2:
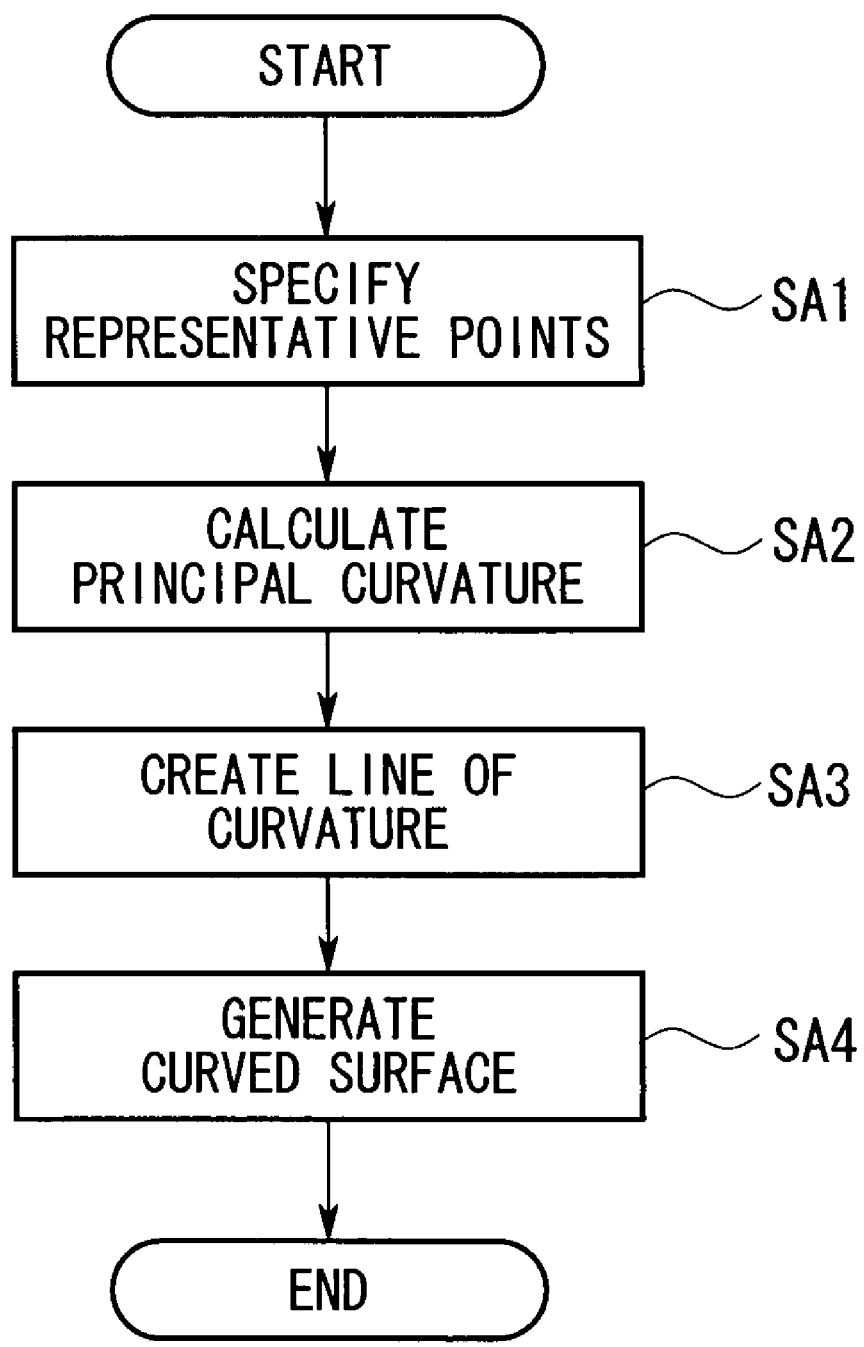
FIG. 2 is a flowchart showing the procedure of a curved-surface generating method according to the first embodiment of the present invention.

When the principal curvatures at each of the representative points P0 are obtained, a line of curvature is created by connecting these principal curvatures (step SA3 in FIG. 2: line-of-curvature creation step).

Then, a curved surface is generated by a curved-surface reproduction technique using this line of curvature (step SA4 in FIG. 2: curved-surface generating step). For example, Gaussian mapping/inverse mapping are performed to generate a curved surface on the basis of the line of curvature. Specifically, the curved surface is generated by interpolation of the curved surface after performing a coordinate transformation to a parameter space in which Euclidean geometry is established.

As described above, with the curved-surface generating method according to this embodiment, after selecting a plurality of representative points P0 from the group of points, the principal curvatures are calculated at the representative points P0 on the basis of the positional relationships between each representative point P0 and the points existing around it, and a line of curvature is created from these principal curvatures. Then, by using this line of curvature, a curved surface is generated by a curved-surface reproduction technique or the like. In this way, a plurality of points around each representative point P0 are taken as auxiliary points for obtaining the principal curvatures, and a curved surface is reproduced. Therefore, the reproduced curved surface can be represented using only the representative points P0. Accordingly, although the curved surface can be represented with an extremely small group of points, because the curved surface is generated using information about all points, it is possible to generate the curved surface with high precision. As a result, it is possible to reduce the amount of data, thus making it possible to speed up the processing.

For example, if a group of points consisting of a plurality of measurement points obtained as the results of shape measurement of an object contains 3 million points, when using the curved-surface generating method according to this embodiment, it is possible to represent a curved surface by using several thousand points.

Second Embodiment

Next, a curved-surface generating method according to a second embodiment of the present invention will be described with reference to the drawings. The difference between the curved-surface generating method according to this embodiment and the curved-surface generating method according to the first embodiment is the addition of the following step in the principal-curvature calculation step (step SA2 in FIG. 2) according to the first embodiment described above in order to further improve the precision of the curved-surface generation.

That is, in the curved-surface generating method of this embodiment, a step of extracting only a fundamental frequency from the angle-curvature table after creating the angle-curvature table (step SB5) and a step of recreating the angle-curvature table for this fundamental frequency are added to the detailed procedure of the principal-curvature calculating step according to the first embodiment shown in FIG. 4, and the principal curvature is obtained from this recreated angle-curvature table.

The step of extracting only the fundamental frequency from the angle-curvature table can be realized by the following technique, for example.

Figure 8:
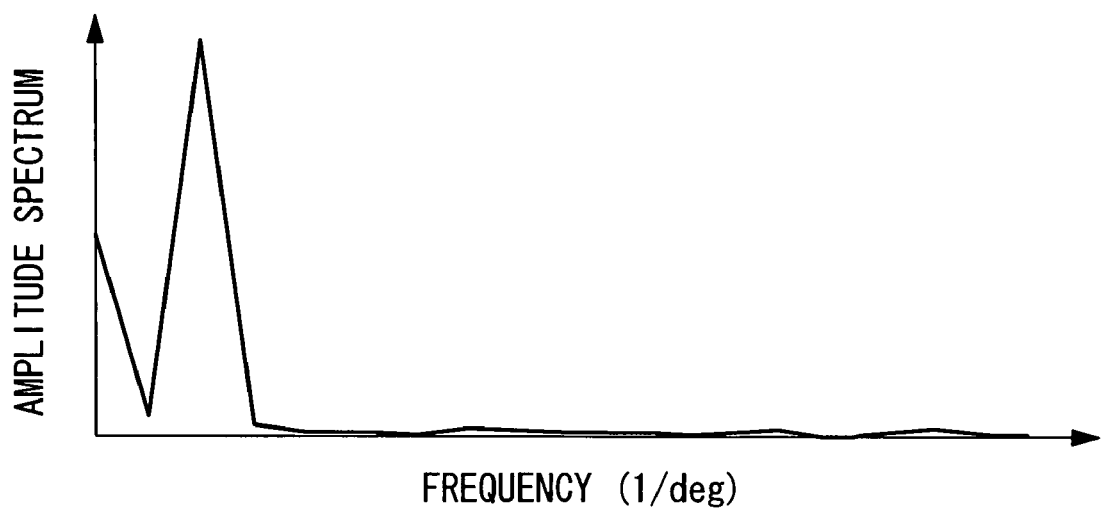
FIG. 8 is a diagram showing a fast Fourier transformed table according to a second embodiment of the present invention.

Frequency components (spectrum) are obtained by fast Fourier transforming (FFT) the angle-curvature table, and in the fast Fourier transformed table, the frequency at which the spectrum shows a maximum value is extracted as the fundamental frequency. An example of the fast Fourier transformed table is shown in FIG. 8. In this fast Fourier transformed table, the horizontal axis is frequency and the vertical axis is the amplitude spectrum.

Figure 9:
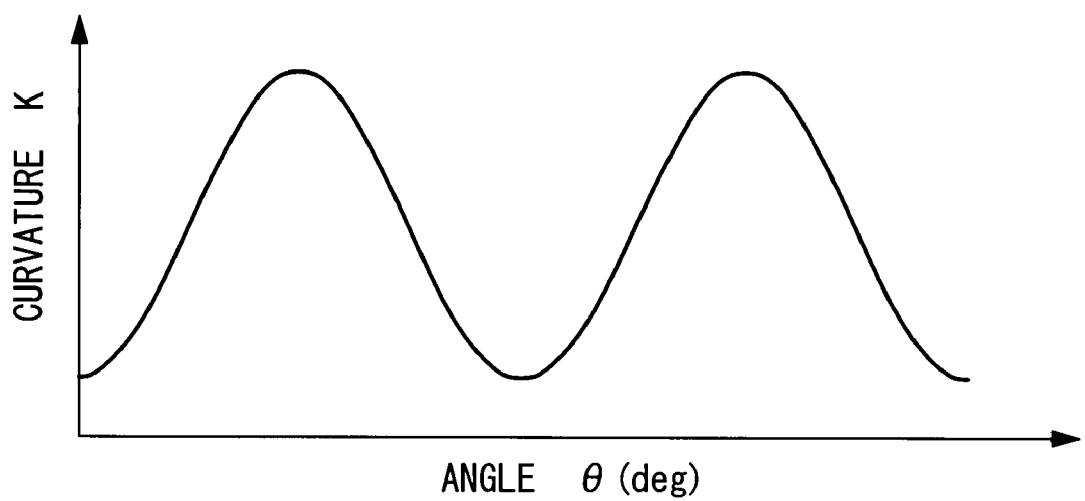
FIG. 9 is a diagram showing an example of an angle-curvature table according to the second embodiment of the present invention, in which only a fundamental frequency is reflected.

Then, by inverse fast Fourier transforming (IFFT) the fundamental frequency component extracted in this way, it is possible to obtain an angle-curvature table in which only the fundamental frequency component is reflected. An example of an angle-frequency table in which only the fundamental frequency component is reflected is shown in FIG. 9. As is clear from this figure, noise is removed from the angle-curvature table according to this embodiment, and it has higher precision compared to the angle-curvature table according to the first embodiment shown in FIG. 7.

Then, by obtaining the maximum curvature Kmax and the minimum curvature Kmin from this angle-curvature table, it is possible to obtain the principal curvature with an extremely small error.

As described above, with the curved-surface generating method according to this embodiment, because the principal curvature is obtained from the angle-curvature table with extremely small error, it is possible to generate a curved surface with extremely high precision. Accordingly, a curved surface generated from a group of points can be assumed to be a smooth surface.

In the embodiment described above, extraction of the fundamental frequency is achieved using a fast Fourier transform (FFT), but it is not limited to this method. For example, it is also possible to use the MEM (Maximum Entropy Method), the BT method (Blackman-Tukey Method), a wavelet method, and so on.

In the embodiment described above, in step SB3 in FIG. 5, the average vector of the group of normal vectors is defined as the normal vector. As described below, however, this average vector may be further corrected and the corrected average vector may be defined as the normal vector.

Figure 7:
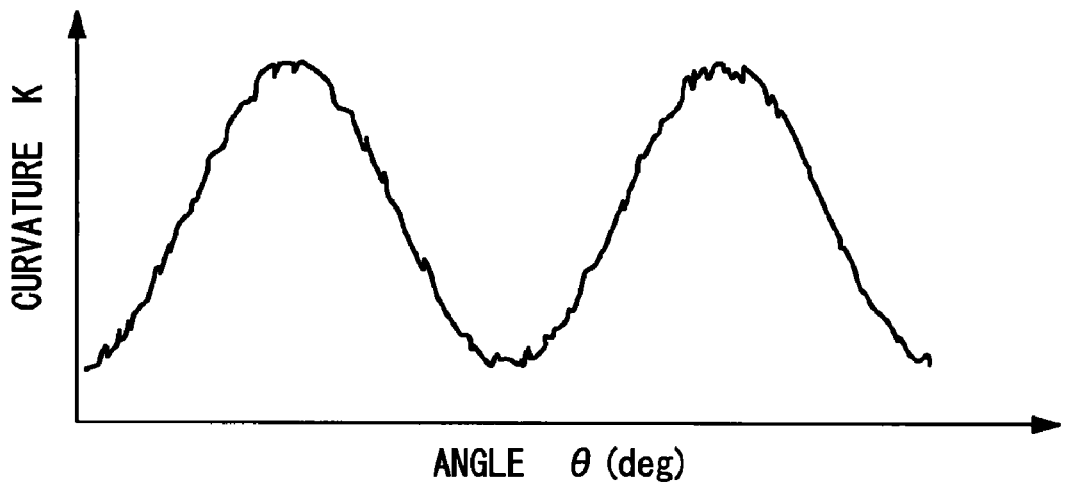
FIG. 7 is a diagram showing an example of an angle-curvature table according to the first embodiment of the present invention.
Figure 10:
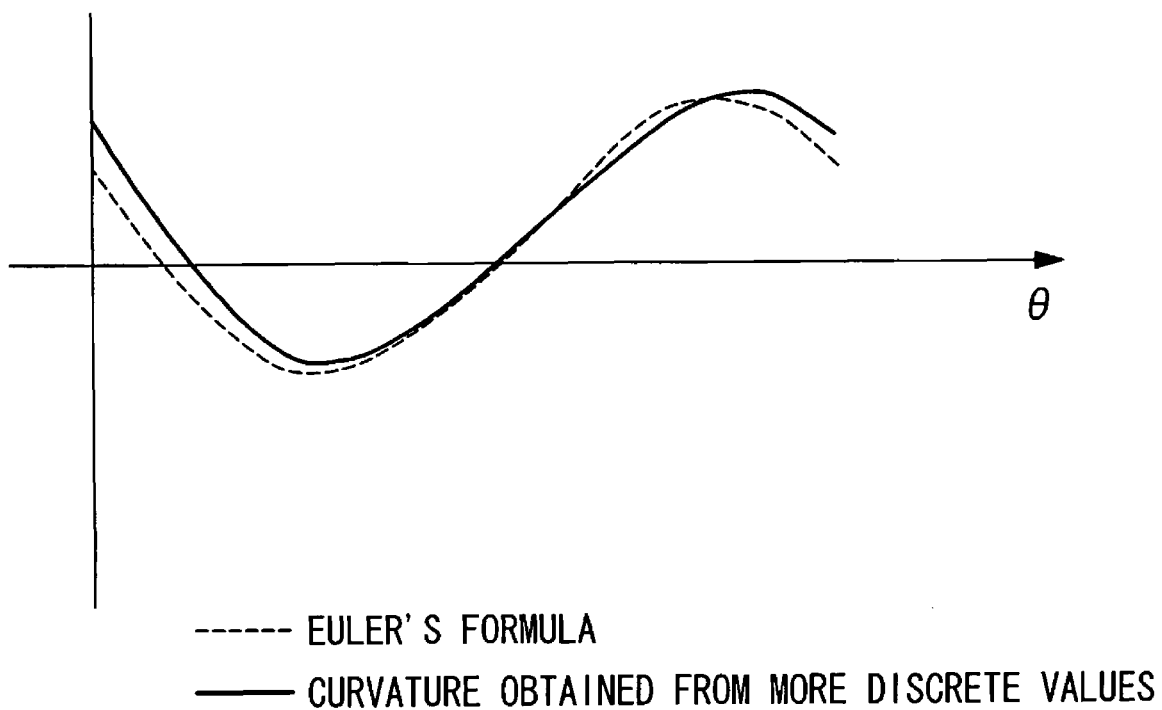
FIG. 10 is a diagram showing an example of an angle-curvature table depicting a line of curvature obtained from measurement values and a line of curvature obtained on the basis of Euler's formula.

First, in the embodiment described above, the tangential vector which is orthogonal to the average vector is set, and the angle-curvature table as shown in FIG. 7 is created from the respective positional relationships between this tangential vector and each of the element vectors L01, L02, L03, and L04. Here, when the average vector described above is not actually a tangential vector, the curve depicted in the angle-curvature table is not an exact cosine wave based on Euler's formula, as shown by the dotted line is FIG. 10, nor a cosine wave but is a curve such as that shown by the solid line in FIG. 10, in other words, a curve whose phase is shifted from the curve based on Euler's formula.

Thus, while finely swinging the average vector to an arbitrary angle to eliminate this error, more concretely, by changing the orientation or direction angle of the average vector shown in FIG. 6 by a small amount at a time, the curve depicted in the angle-curvature table (the solid line in FIG. 10) is corrected, and the average vector when this curve is substantially aligned with the curve based on Euler's formula (the dotted line in FIG. 10) is defined as the normal vector.

With this approach, because it is possible to determine the normal vector based on Euler's formula, it is possible to increase the precision.

Although the embodiments of the present invention have been described above with reference to the drawings, the actual configuration is not limited to these embodiments. Various modifications are possible so long as they do not depart from the spirit of the invention.

What is claimed is:

1. A curved surface generating method, performed by a computer aided design system or a computer aided manufacturing system including a computer, for generating a curved surface from a group of points formed of a plurality of measurement points obtained as results of shape measurement of an object, comprising:
a representative-point selection step, performed by said computer, of selecting a plurality of representative points from the group of points;
a principal-curvature calculating step, performed by said computer, of calculating respective principal curvatures at each of the representative points on the basis of positional relationships between each representative point and a plurality of the measurement points existing around this representative point;
a line-of-curvature creating step, performed by said computer, of creating a line of curvature on the basis of the principal curvatures at each representative point; and
a curved-surface generating step, performed by said computer, of generating a curved surface by using the line of curvature,
wherein the principal-curvature calculating step includes,
a step of setting a normal at each representative point;
a tangential-vector setting step of setting a tangential vector that is orthogonal to the normal;

a step of generating element vectors by joining each representative point and each point existing around this representative point;

a step of calculating angles formed by the tangential vector and the element vectors around the normal;

a step of calculating angles formed by a tangential plane including the tangential vector and planes including the element vectors and defining the angles as curvatures;

a step of creating angle-curvature tables by plotting the calculation results on a horizontal axis in angle-curvature tables; and a step of obtaining the principal curvatures on the basis of the curvature tables.

2. A curved-surface generating method according to claim 1, wherein the principal-curvature calculating step includes a step of setting a normal at each representative point;

a step of generating element vectors by joining each representative point and each points existing around this representative point; and a step of determining the principal curvatures on the basis of relationships between the normal and the element vectors.

3. A curved-surface generating method according to claim 1, wherein the principal-curvature calculating step includes a step of setting a normal at each representative point;

a tangential-vector setting step of setting a tangential vector that is orthogonal to the normal;

a step of generating element vectors by joining each representative point and each point existing around this representative point;

a step of calculating angles formed by the tangential vector and the element vectors around the normal;

a step of calculating angles formed by a tangential plane including the tangential vector and planes including the element vectors and defining the angles as curvatures;

a step of creating angle-curvature tables by plotting the calculation results on a horizontal axis in angle-curvature tables;

an extraction step of extracting only a fundamental frequency from the curvature tables; and a principal-curvature obtaining step of obtaining the principal curvatures from the angle-curvature table on the basis of the fundamental frequency.

4. A curved-surface generating method according to claim 1, wherein the principal-curvature calculating step includes a step of generating element vectors by joining each representative point and each point existing around this representative point;

a step of determining a group of normal vectors at each representative point by calculating vector products of the element vectors; and a step of determining an average vector of the group of normal vectors and defining the average vector as a normal vector at each of the representative points.

5. A computer-readable storage medium storing a curved-surface generating program for executing, on a computer system, curved-surface generating processing for generating a curved surface from a group of points formed of a plurality of measurement points obtained as results of shape measurement of an object, the curved-surface generating program comprising:

a representative-point selection step of selecting a plurality of representative points from the group of points;

a principal-curvature calculation step of calculating respective principal curvatures at each representative point on the basis of positional relationships between each representative point a plurality of the measurement points existing around this representative point;

a line-of-curvature creating step of creating a line of curvature on the basis of the principal curvature at each representative point; and a curved-surface generating step of generating a curved surface by using the line of curvature, wherein the principal-curvature calculating step includes, a step of setting a normal at each representative point;

a tangential-vector setting step of setting a tangential vector that is orthogonal to the normal;

a step of generating element vectors by joining each representative point and each point existing around this representative point;

a step of calculating angles formed by the tangential vector and the element vectors around the normal;

a step of calculating angles formed by a tangential plane including the tangential vector and planes including the element vectors and defining the angles as curvatures;

a step of creating angle-curvature tables by plotting the calculation results on a horizontal axis in angle-curvature tables; and a step of obtaining the principal curvatures on the basis of the curvature tables.

6. A three-dimensional shape processing apparatus, comprising:

a computer-readable storage medium storing a curved-surface generating program and which generates a curved surface from a group of points formed of a plurality of measurement points obtained as results of shape measurement of an object by executing the curved-surface generating program, wherein the curved-surface generating program includes a representative-point selection step of selecting a plurality of representative points from the group of points;

a principal-curvature calculating step of calculating respective principal curvatures at each representative point on the basis of positional relationships between each representative point and a plurality of the measurement points existing around this representative point;

a line-of-curvature creating step of creating a line of curvature on the basis of the principal curvature at each representative point; and a curved-surface generating step of generating a curved surface by using the line of curvature, wherein the principal-curvature calculating step includes, a step of setting a normal at each representative point;

a tangential-vector setting step of setting a tangential vector that is orthogonal to the normal;

a step of generating element vectors by joining each representative point and each point existing around this representative point;

a step of calculating angles formed by the tangential vector and the element vectors around the normal;

a step of calculating angles formed by a tangential plane including the tangential vector and planes including the element vectors and defining the angles as curvatures;

a step of creating angle-curvature tables by plotting the calculation results on a horizontal axis in angle-curvature tables; and a step of obtaining the principal curvatures on the basis of the curvature tables.

* * * * *